United States Patent [19]

Marriott

[11] 4,109,044

[45] Aug. 22, 1978

[54] ELECTRICALLY HEATED WINDOW HAVING SHARPLY BENT PORTIONS

[75] Inventor: James G. Marriott, Perrysburg, Ohio

[73] Assignee: Libbey-Owens-Ford Company, Toledo, Ohio

[21] Appl. No.: 718,154

[22] Filed: Aug. 27, 1976

[51] Int. Cl.$^2$ .......................... C03B 23/02; H05B 3/06

[52] U.S. Cl. ...................................... 428/210; 52/171; 219/203; 219/522; 219/547; 296/85; 65/107; 427/96; 427/108; 428/195; 428/433; 428/901

[58] Field of Search ............... 428/195, 210, 433, 901; 219/203, 522, 547; 296/85; 52/171; 427/108-110, 96; 65/107

[56] References Cited

U.S. PATENT DOCUMENTS

| | | | |
|---|---|---|---|
| 3,762,903 | 10/1973 | Hamilton | 65/107 |
| 3,762,904 | 10/1973 | Hamilton | 65/107 |
| 3,792,232 | 2/1974 | Zarenko | 219/203 |
| 3,865,680 | 2/1975 | Reese | 427/108 |
| 3,947,618 | 3/1976 | Gruss | 219/203 |
| 4,002,450 | 1/1977 | Hamilton | 65/107 |

*Primary Examiner*—John D. Smith
*Attorney, Agent, or Firm*—Collins, Oberlin & Darr

[57] ABSTRACT

A window formed of a glass sheet having a combined electrical heating circuit and bending circuit imprinted thereon. The heating circuit comprises a series of longitudinally extending conducting lines interconnecting spaced bus bars. The bending circuit includes resistance elements in the form of electrically conducting paths extending transversely of the sheet along the lines about which the sheet is to be sharply bent and which intersect the longitudinal conducting lines of the heating circuit. Interruptions are formed along the bus bars of the heating circuit in a manner isolating the latter from the bending circuit during the formation of sharp bends in the glass sheet.

12 Claims, 6 Drawing Figures

ELECTRICALLY HEATED WINDOW HAVING SHARPLY BENT PORTIONS

BACKGROUND OF THE INVENTION

This invention relates generally to electrically heated glazing closures and, more particularly, to an electrically heated window provided with a second electrical circuit for effecting sharp angular bends in the window.

A well known expedient for defogging or deicing the windows of automotive vehicles and the like is the use of heating circuits comprised of electrical resistance elements. Sometimes these resistance elements are formed of an electrically conducting material superimposed or fused on the inboard or inner surface of the glass sheet in a pattern of parallel lines extending lengthwise of the sheet or in a generally horizontal direction when installed in the vehicle. These parallel lines are connected at their opposite ends to electrodes or bus bars located adjacent the opposite ends of the glass sheet and extending generally transversely thereof. The heating circuit is imprinted on the glass sheet prior to bending the same into the desired configuration.

In recent years, it has sometimes become desirable to provide one or more relatively sharp angled bends in the glazing closure to carry out styling features found in the adjacent sheet metal panels of the vehicle. One of the most successful techniques for producing sharply bent glass sheets is provided by the glass bending methods disclosed and claimed in U.S. Pat. Nos. 3,762,903 and 3,762,904, assigned to the assignee of the present invention, whereby an electrically conducting path is formed on at least one surface of the glass sheet along one or more lines about which it is desired to sharply bend the sheet. The sheet is then supported on a suitable gravity-type mold structure and heated in a furnace to a temperature corresponding to the softening point of the glass, causing it to sag by gravity into conformance with the shaping surfaces of the mold while simultaneously passing an electric current through said path or paths to heat the area of the glass sheet immediately adjacent said paths to a temperature above the aforementioned softening point, causing said sheet to bend sharply along said paths to form the relatively sharp angles therein. A problem is encountered in employing this technique to form sharp bends in glazing closures having heated circuits imprinted thereon because the electrically conducting paths of the bending circuit necessary for producing the sharp bends intersect the electrically conducting lines of the heating circuit which tend to dissipate some of the current otherwise intended solely for the bending circuit. The known "cross over" technique, which involves interposing or sandwiching an insulator between otherwise intersecting wires for electrically separating the same would involve at least one, and more likely two, additional printing steps in the printed dual-circuit arrangement herein contemplated, adding materially to the costs of production.

SUMMARY OF THE INVENTION

It is an object of the present invention to provide an improved electrically heated window provided with an additional electrical circuit for effecting sharp bends in such windows.

It is another object of this invention to provide the foregoing electrically heated window with a novel dual-circuit arrangement isolating the heating circuit from the additional circuit during the window bending operation.

It is a further object of the present invention to provide an improved method for forming an electrically heated window with relatively sharp angled bends.

In one aspect thereof, the electrically heated window of the present invention is characterized by the provision of two electrical circuits formed on the window and a novel arrangement for isolating one from the other to permit the passage of current solely through the electrically conducting paths about which it is desired to sharply bend the window to precisely control deformation during bending.

The foregoing and other objects, advantages, and characterizing features of the present invention will become clearly apparent from the ensuing detailed description of an illustrated embodiment thereof, taken together with the accompanying drawings wherein like reference characters denote like parts throughout the various views.

DESCRIPTION OF THE PREFERRED EMBODIMENT

Figure 1:
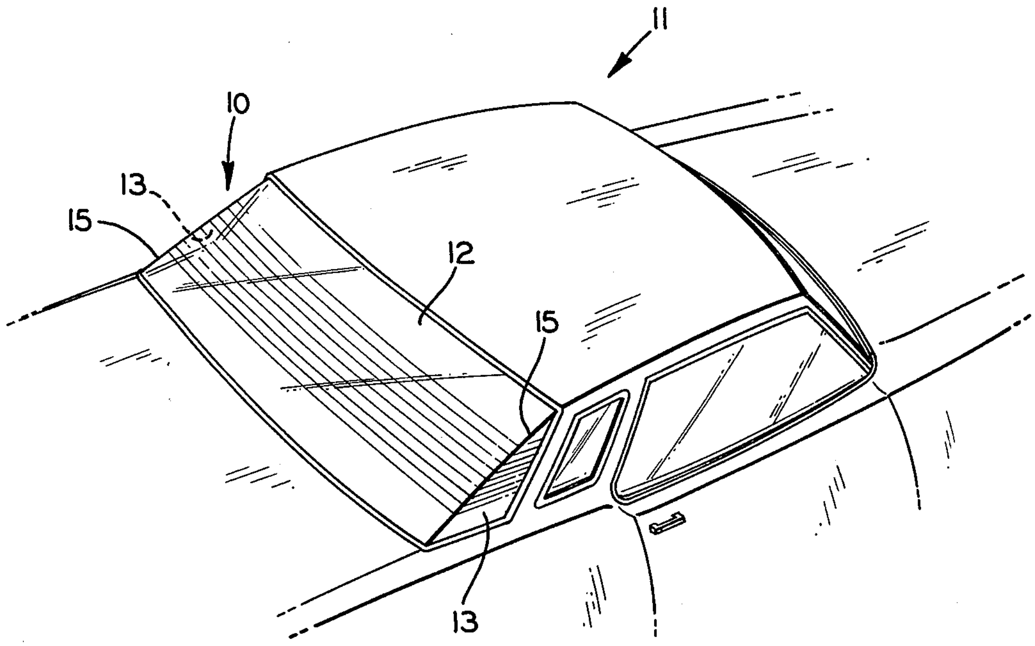
FIG. 1 is a perspective view of an automobile including an electrically heated backlight comprised of a monolithic glass sheet bent in accordance with recent styling designs.

Referring now in detail to the drawings, there is depicted in FIG. 1 a backlight 10 bent to the desired configuration in accordance with this invention and shown installed in an automobile 11 embodying recent styling features. The backlight 10 is comprised of a monolithic glass sheet having a central body portion 12 and inturned opposite end or side portions 13 of generally triangular configurations in outline. The side portions 13 are bent at sharp angles about straight lines, indicated generally at 15, which extend from one longitudinal edge of the glass sheet to the other adjacent the opposite sides of the automobile. While it will be convenient to describe aspects of this invention in connection with a glazing closure comprised of a single sheet and having two transversely extending, sharp angular bends therein, it should be appreciated that the invention contemplates the production of glass sheets having any number of sharp angled bends in a transverse and/or longitudinal direction and/or multiple layered sheets of glass, such as conventional laminated windshields for example.

Figure 3:
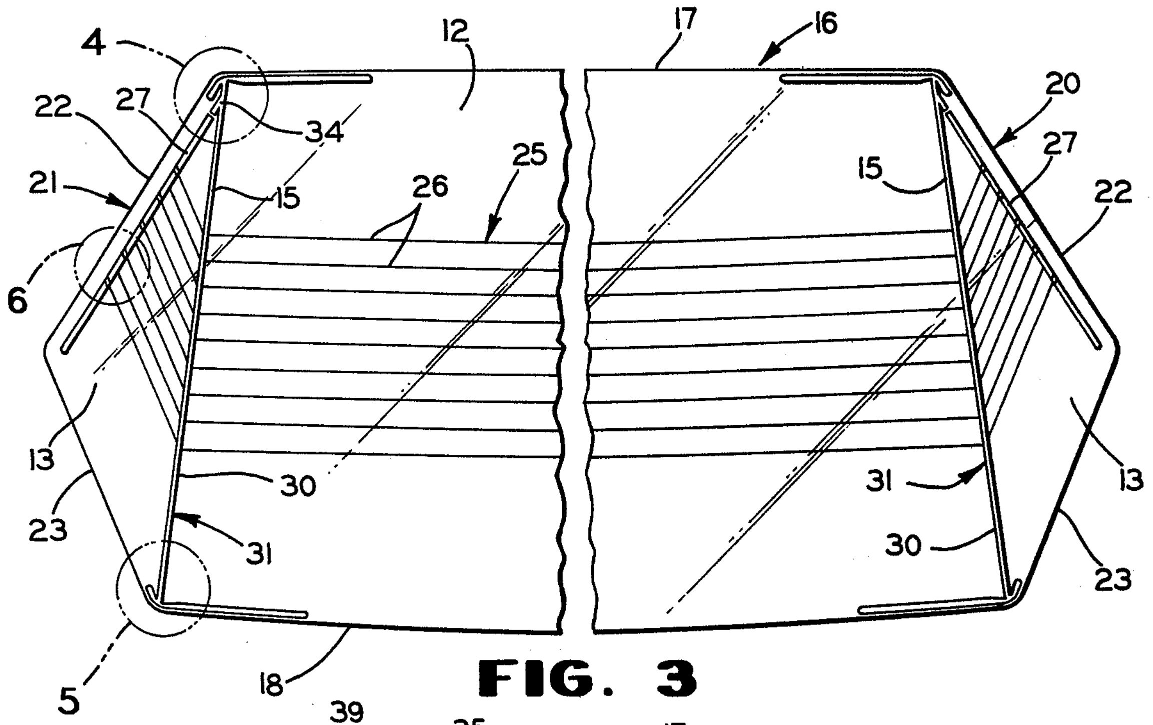
FIG. 3 is a front elevational view of the heated backlight in a flat condition prior to bending, showing the combined heating and bending circuits imprinted thereon.

Referring now to FIG. 3, the backlight 10 is formed of a flat, monolithic glass sheet 16 of generally hexagonal configuration in outline having an upper marginal edge 17 and a lower marginal edge 18 connected by end edges 20 and 21. Each of the end edges has angularly related portions 22 and 23 extending from the central body portion 12 in a converging relation to form with the transverse lines 15 generally triangular configurations in outline. As used herein, the terms upper, lower, top, bottom, horizontal, vertical and the like are applied only for convenience of description with reference to FIG. 3 of the drawings and should not be taken as limiting the scope of this invention.

Figure 2:
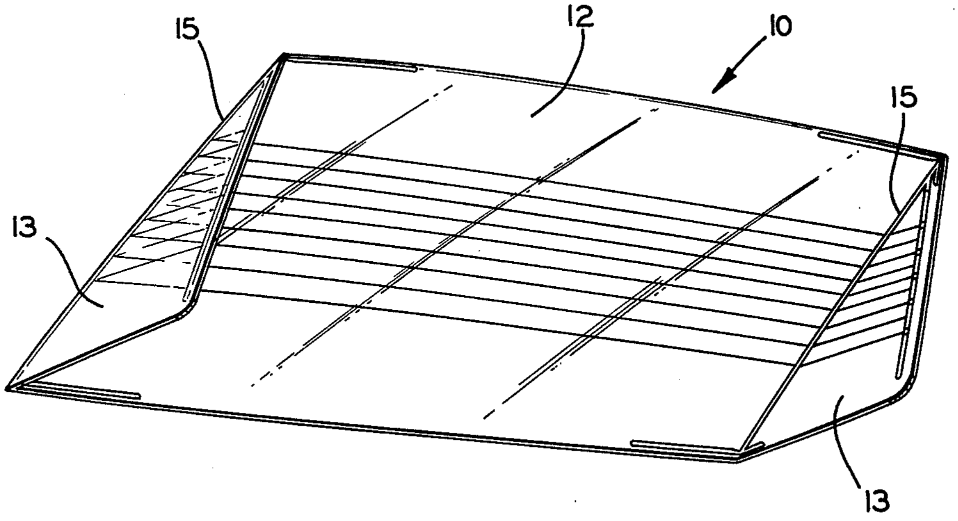
FIG. 2 is a perspective view of the inboard surface of the backlight illustrated in FIG. 1, showing the glass sheet immediately after sharp bends have been formed therein.

The backlight 10 is provided with an electrical heating circuit or grid, generally designated 25, comprising a plurality of equally spaced, parallel, electrically conducting silver-glass frit lines 26 extending longitudinally across the entire central body portion 12 of sheet 16 and then laterally at an angle across the side portions 13 in substantial parallelism with the lower side edge portions 23. The electrically conducting frit lines 26 are connected in parallel at their opposite ends to electrodes or bus bars 27 extending parallel to the edge portions 22 of the glass sheet and adapted to be provided with suitable terminals (not shown) for connection to the automobile electrical system. Upon energization, the current flowing through conducting lines 26 generates sufficient heat to deice or defog the backlight as required. These electrically conducting lines 26 appear only as very fine lines on the inboard surface of the sheet so as not to materially obstruct the viewing area, their size being somewhat exaggerated in FIGS. 2 and 3 for purposes of illustration. The bus bars 27 preferably also are formed of a silver-glass frit composition and are of a substantially wider dimension to assure good electrical contact with the electrical connection subsequently affixed thereto as will hereinafter be more fully described. The conducting lines 26 and bus bars 27, which are imprinted on the glass surface prior to the bending or shaping thereof, are positioned on the inboard surface of the sheet 16 to minimize deterioration thereof otherwise resulting from weathering and excessive abrasive cleaning after subsequent installation in a motor vehicle.

In order to produce the sharply bent side portions 13, the glass sheet is bent at relatively sharp angles about the spaced lines 15 by concentrating heat along such lines 15 and allowing the sheet to sag by gravity into conformance with the shaping surface of a gravity-type skeleton mold (not shown). One recently developed process for localizing heat along the desired lines of bend includes forming electrically conducting paths constituting electrical resistance elements on at least one surface of the sheet along the lines about which it is desired to bend the sheet and then passing an electrical current along said paths to heat the sheet in the area immediately adjacent said paths to a temperature above the bending point of the glass, causing the sheet to bend sharply about said superheated paths. These electrical resistance elements, or electrically conducting paths, generally designated 30 in the illustrative embodiment, are substantially coextensive with the desired lines of bend 15 and are formed of an electrically conducting silver-frit material also superimposed in strip form on the inboard or inner surface of the glass sheet.

Heretofore, the utilization of electrical resistance elements in the form of electrically conducting paths to effect sharp bends in glass sheets were connected in series. However, bending control cannot be achieved when two or more electrically conducting paths are connected in series and are intercepted by the conducting lines of a parallel heating circuit because the current intended for the former is diverted through the latter, thereby providing non-uniform heating along the paths with consequent loss of deformation or bending control. To avoid this problem, the electrically conducting paths 30 depicted in the illustrative embodiment of the drawings are connected in a parallel circuit, hereinafter referred to as the "bending circuit" 31, to distinguish it from the heating circuit 25.

As shown in FIG. 3, the electrically conducting paths 30 of the bending circuit 31 extend transversely across the glass sheet 16 between the upper and lower marginal edges 17 and 18 and each is provided at its opposite ends with lateral extensions 32 and 33 (FIGS. 4 and 5) of any desired or required length extending along and substantially parallel to the marginal upper and lower edges 17 and 18 and the angular edge portions 22 and 23, respectively. Extensions 32 and 33 offer versatility in the placement of electrical contacts (not shown) at selected positions on the glass sheet where the least amount of glass displacement relative to the mold occurs or where obstructions imposed by the structure of the specific mold employed prohibit electrical connections at the very ends of the electrically conducting paths 30. The cross sectional areas of the extensions 32 and 33 are somewhat greater than that of the paths 30 to provide a substantially lesser resistance to current flow and thereby the generation of lesser heat therethrough to preclude undesirable deformation or distortion therealong. While two electrically conducting path extensions are shown and described in the circuitry of the illustrative embodiment, it should be understood that only the extensions 32 may be utilized, if desired.

Figure 4:
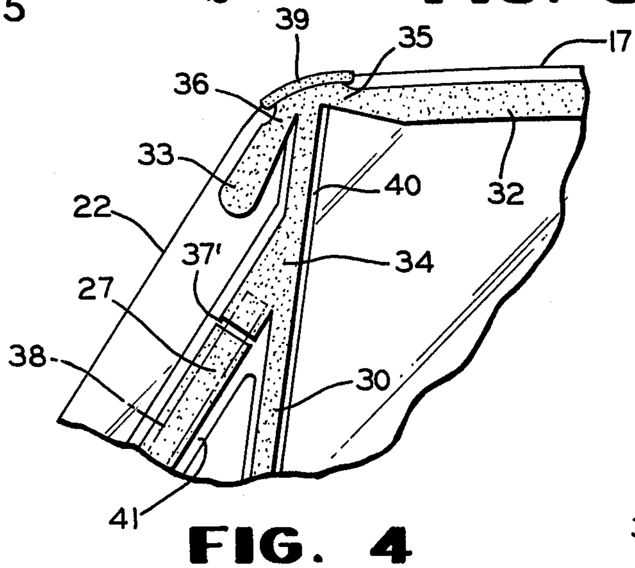
FIGS. 4 and 5 are enlarged fragmentary views of the encircled portions 4 and 5 of FIG. 3, showing the upper and lower left corners, respectively, of the flat glass sheet.
Figure 6:
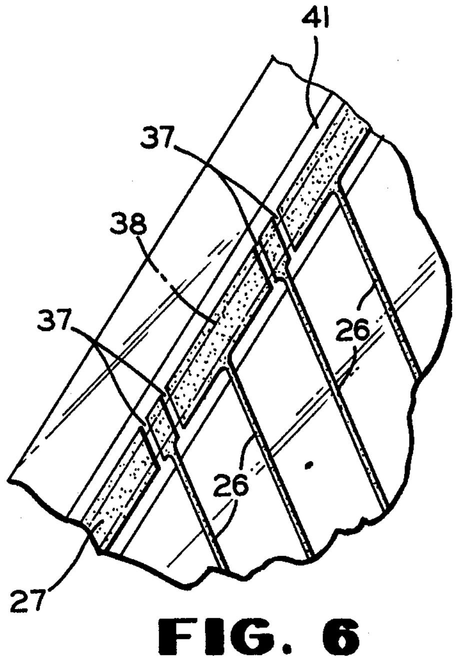
FIG. 6 is an enlarged fragmentary view of the encircled portion 6 of FIG. 3, showing the grid and bus bar pattern of the heating circuit as initially formed.
Figure 5:
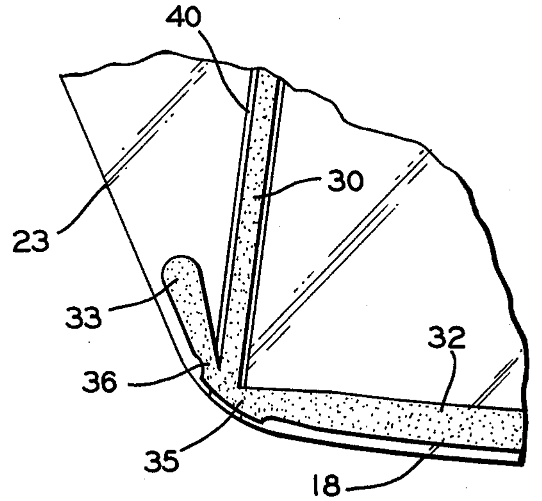

In order to prevent possible damage to the electrically connecting paths 30, which could occur as a result of the temperature differential generated between paths 30 and extensions 32, 33 due to the drastic transition between the greater cross sectional areas of the latter relative to the former, the cross sectional areas of extensions 32 and 33 are reduced, as shown at 35 and 36 in FIGS. 4 and 5, to approximately the cross sectional areas of paths 30 at the junctures therewith.

A feature of this invention resides in electrically connecting the electrically conducting paths 30 to bus bars 27, respectively. As best shown in FIG. 4, each bus bar 27 is joined at its upper end to the associated electrically conducting path 30 at a juncture 34 for a purpose that will hereinafter be more fully explained.

As shown in FIG. 3, the transversely extending electrically conducting paths 30 of the bending circuit 31 intersect the longitudinally extending conducting lines 26 of the heating circuit 25. Such an arrangement poses problems in maintaining the current uniform throughout the paths 30 when energized to effect the desired sharp bends because of the dissipation of at least some of the current into the heating circuit 25 and which is otherwise intended solely for the bending circuit 31. In an effort to solve this problem in accordance with the present invention, means are provided to isolate the heating circuit 25 from the bending circuit 31 when the latter is energized to produce the desired sharp bends. To this end, the bus bars 27 are interrupted on opposite sides of each juncture or connection thereof with a conducting line 26 to provide discontinuities or gaps 37 in the bus bars 27 between adjacent conducting line connections. The gaps 37 are of relatively small but sufficient width to interrupt the flow of electrical energy thereacross. The bus bars 27 are initially formed with these gaps 37 to isolate the heating circuit 25 from the bending circuit 31 when the latter is energized. After the glass sheet has been bent into the desired shape, such as that shown in FIG. 2, these gaps 37 can be bridge or otherwise suitably closed by a lead-in-wire in the form of a metallic, conductive strip 38, shown in dashed lines in FIG. 4, adhesively secured, as by soldering, to the respective bus bar 27.

After the formation of the sharp bends in the glass sheet caused by the application of power through the electrically conducting path 30, the silver-glass frit composition forming the latter aheres to the glass sheet in the form of a yellow-brown stain extending longitudinally along the sharp bends. It is desirable to at least alter the color of the residual strain in an effort to obtain a more favorable color pattern from the standpoint of aesthetics and which is more compatible with the color combinations of the automobile body in a manner enhancing the general appearance of the vehicle. It has been found that the application of a suitable coloring agent as an undercoating or substrate for the electrically conducting silver-glass frit material serves to alter the residual stain sufficiently to yield the desired final appearance in accordance with styling requirements. To this end, and prior to forming the resistance elements or electrically conducting paths 30 on the glass surface, a coloring agent is applied to at least one surface of the glass sheet 16 as strips or bands 40 upon which the paths 30 will be subsequently formed and about which it is desired to bend the sheet. Also, bands 41 of coloring agent are applied to the same surface as an undercoating for the subsequently formed bus bars 27 so that the more discernable or pronounced lines in the finished glazing closure will be uniformly colored. Moreover, the bands 41 serve to conceal or mask the gaps 37 that would otherwise appear on the finished window. The electrically conducting path extensions 32 and 33 are not similarly undercoated because they are concealed by the frame or superstructure of the automobile when the finished window is installed in place. Nor are the thin conducting lines 26 undercoated since it is desired to maintain them as fine as possible so as not to materially obstruct the viewing area of the finished window.

While various colored pigments may be used as the coloring agent for this undercoating, preferred compositions comprise pure black pigments and/or mixtures of pure black pigments and black enamels, i.e., black pigments containing a minor percentage of frit. For specific examples of coloring agent compositions, reference may be had to U.S. Pat. No. 3,879,184, assigned to the same assignee as the present invention. The desired pigments or other suitable coloring agents can be applied to the glass sheet surface by conventional silk screen processes, painting, or other known coating processes and then allowed to dry at room temperature.

After the coloring agent forming the bands 40 and 41 is dried, the electrically conducting material forming the conducting lines 26 and bus bars 27 of heating circuit 25, as well as the resistance elements or electrically conducting paths 30 along with their respective extensions 32 and 33 of the bending circuit 31, can be formed on the glass sheet surface with the electrically conducting paths 30 and bus bars 27 superimposed on the bands 40 and 41, respectively. While various materials may be used to form the circuits, preferred compositions are comprised of conductive metal pastes. These paste materials, sometimes also referred to as inks, are applied to the glass sheet by conventional silk screen processes, painting, or other conventional coating techniques and then are heated or fired to fuse the material to the sheet.

Typically, the pastes comprise conductive metal particles such as silver for example, glass frit particles and organic binders and solvent. The glass frit, in addition to fusing the material to the sheet, also serves as an extender by which the desired conductivity or resistivity is achieved in the several electro-conductive lines, bus bars and paths. Thus, for a given cross sectional area of these several elements, the silver, which imparts electrical conductivity thereto, can be diluted or extended with the glass frit to attain the desired resistance-conductivity characteristics to in turn influence the extent of heat developed in these elements in the glass immediately adjacent thereto.

Although the conductive silver pastes are ideally suited for forming the electrically conducting paths, other conductive metal pastes may be used, e.g., those containing gold, palladium, platinum and alloys thereof. In addition, air drying dispersions of conductive metals may be employed. One particular material of this type which has been used successfully is "Dag 422," a dispersion of silver plus graphite in a water carrier obtained from the Acheson Colloids Company, Port Huron, Mich. Also, materials such as electrically conducting tapes for the paths 30, which may or may not be removed after the bending step, can be employed.

After the electrically conducting lines 26, bus bars 27 and paths 30, which may be simultaneously or sequentially applied, have been satisfactorily laid down and fired, the glass sheet can be positioned on a suitable gravity-sag type bending mold (not shown) by supporting the opposite ends of the sheet on a shaping surface of the mold. The bending mold is provided with electrical conducting means including contacts and may be somewhat similar to that disclosed in application Ser. No. 558,288, filed Mar. 14, 1975, now U.S. Pat. No. 4,002,450 assigned to the same assignee as the present invention, except for a differently configurated outline and the provision in the instant mold of two articulated end sections pivotally joined to a common central body portion. The contacts can be selectively applied to the opposite ends of the electrically conducting paths 30 or to their respective extensions 32, 33 for electrically connecting the paths 30 to a suitable electrical power source (not shown) via the electrical conducting means forming a part of the bending mold. Where it is desired to apply the electrical contacts to the edge portions of the sheet, an electrically conducting silver-frit material, similar to that employed for the electrically conducting paths 30, can be hand painted along such edge portions and extended onto the opposite ends of the path 30, such as shown at 39 in FIG. 4 for example.

Prior to supplying power to the electrically conducting paths 30, the bending mold and glass sheet carried thereby are preferably heated to a relatively high temperature, for example, above the strain point of the glass but below the bending point of the temperature at which the glass bends to any significant degree. In this respect, temperatures in the range from approximately 900° to 1150° F have been found satisfactory. The purpose of this preliminary heating, which preferably is accomplished by conveying the mold through a furnace, is to prevent the formation of permanent stresses in the glass, obviate the tendency of the glass to crack when subsequently heated locally along the electrically conducting paths 30 to its bending temperature, and also to enable the accomplishment of this latter step within a time acceptable from a commercial standpoint and with the use of a reasonable amount of electrical energy.

Upon the glass sheet reaching the desired over-all temperature, power is supplied to the mold contacts and consequently to the electrically conducting paths 30. This in turn heats the glass sheet immediately adjacent paths 30 to a temperature above the bending temperature of the glass, for example above approximately 1200° F, at which time the sheet bends sharply along the paths 30 and settles by gravity on the mold into the configuration illustrated in FIG. 2. The sheet can then be tempered and allowed to cool at room temperature.

Although the electrically conducting paths 30 intersect the lines 26 of the heating circuit 25, the electrical current supplied via the bending mold and introduced into the electrically conducting paths 30 is confined solely thereto and isolated from the heating circuit 25 because of the interruptions of current flow therethrough resulting from the discontinuities or gaps 37 formed in bus bars 27. Also, the provision of gaps 37' in the bus bars 27 adjacent their junctures with the electrically conducting paths 30 separate the bus bars 27 from the paths 30 during energization of the latter to preclude undesirable heat build-up in the bus bars which tends to inhibit the formation of a good soldered connection between the bus bars and the lead-in wire strips 38 subsequently applied.

Prior to the installation of the finished glazing closure in an automobile or the like, the lead-in wires or conductive strips 38 are affixed to the bus bars 27, as by soldering thereto at spaced points. While the solder may be applied at the gaps 37 of bus bars 27, preferably the solder is applied at equally spaced points on and along the bus bars 27, these conductive strips 38 bridging the gaps 37 and 37' to provide electrical continuity along bus bars 27. The free ends of lead-in-strips 38 are electrically connected to suitable terminals (not shown), in turn connected to the vehicle electrical system.

In use, when the heating circuit 25 is energized, a potential difference is applied between the bus bars 27 to generate current flow through lines 26 and convert the electrical energy into the necessary heat energy for deicing or defogging the window, as required. It should be understood that the central body portion 12 of the finished backlight 10 depicted in the illustrative embodiment is the critical viewing area and that as much of the power as is available should be retained in this central portion for defogging and/or deicing the same. The rapid defogging and/or deicing of the heated area of side portions 13, which together constitute only about 12% of the window heating area, is inconsequential. Indeed, it would not be necessary to electrically heat these side portions at all. Accordingly, the ideal design would be to employ the electrically conducting paths 30 as the bus bars and thereby confine all of the available power to the central portion, where it is most needed. However, the paths 30 cannot adequately serve as bus bars because of the cross sectional limitations imposed by the bending process and because the exposure of the subsequently applied lead-in-strips 38 would render them especially vulnerable to abrasive action and damage. Also, the presence of these braided lead-in-strips would, from the standpoint of aesthetics, detract from the final appearance of the installed window. Thus, the conducting lines 26 of the heating circuit 25 are extended past the paths 30 and interconnected by the bus bars 27, which are of adequate cross sectional dimensions to efficiently perform their functions and which are located adjacent the opposite ends of the finished window where they can be readily concealed and protected by the window frame construction of the vehicle.

Therefore, while some of the available electrical power must be directed to the window side portions 13, it is desirable to direct as little power thereto as possible, not only for the reasons advanced above, but also because of excessive heat build-up in the side portions 13, as explained below. For example, with bus bars 27 disconnected from the electrically conducting paths 30, which are fused on the window as a permanent part thereof and which intersect the heating circuit conducting lines 26, it was found that approximately 17% of the total power would be dissipated in the side portions 13, the average power density calculated in each side portion 13 being about 57% greater than the average power density in the central portion 12 because of the closer spacing between adjacent conducting lines 26 in side portions 13. Also, the average power density for the individual lines 26 in side portions 13 greatly exceeded the average power density for the individual lines 26 in the central portion 12 due to the substantial differences in line lengths. These factors contribute to excessive heat generation in the side portions 13, particularly in the relatively narrow upper corners thereof, due to the relatively close spacing between adjacent conducting lines 26 and the progressively shorter lengths thereof. Such heat build-up can adversely affect the interior of the surrounding vehicle structure and, upon accidental human contact with the hot glass, produce discomfort, if not physical pain.

Heat build-up in the side portions 13 is drastically reduced in accordance with the present invention by electrically connecting the bus bars 27 to electrically conducting paths 30, as at junctures 34. When the heating circuit is energized, the paths 30 offer a substantially less resistant path than conducting lines 26 in side portions 13 to permit a substantial portion of the current to bypass these side portion conducting lines 26 with consequent less heat generation thereby. With the bus bars 27 connected to paths 30, it was found that the power dissipated in the side portions was reduced to 11% of the total power available for the heating circuit, the average power density calculated in each side portion 13 being 5% less than the average power density in the central portion 12. Also, the power density for the individual conducting lines 26 in side portions 13 was materially reduced as compared to the power density for the individual lines calculated when the bus bars 27 were disconnected from electrically conducting paths 30. As a result, the major portion of the available power for heating circuit 25 is retained within the central body portion 12 of the backlight 10, with the least amount of power possible being diverted to the side portions 13.

From the foregoing, it is apparent that the objects of the present invention have been fully accomplished. As a result of this invention, relatively sharp angled bends can be imparted to an electrically heated window by superimposing a second circuit having electrically conducting paths thereon and passing current therethrough to generate localized heat along the lines about which it is desired to sharply bend the electrically heated window. Because of the intersection of said paths with the electrically conducting lines of the window heating circuit, the two circuits are isolated during bending by initially forming the bus bars of the window heating circuit with interruptions in a pattern electrically disconnecting adjacent conducting lines. After bending, these interruptions are bridged by affixing lead-in-wires to the bus bars to provide continuity in the window heating circuit. In use, the interconnection of the electrically conducting paths 30 with the heating circuit bus bars 27 on the finished window assist in reducing power consumption in the sharply bent side portions to increase the proportion of power available to the central portion of the window, where clear vision is most critical.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

I claim:

1. A glass sheet adapted to be sharply bent about at least one line extending transversely of said sheet comprising: a first circuit formed of electrically conducting material imprinted on one surface of said glass sheet and including a pair of bus bars and a plurality of spaced electrically conducting lines extending between and connected at their opposite ends to said bus bars, at least one electrically conducting path formed of electrically conducting material imprinted on said one surface between said bus bars and coincident with the line about which it is desired to bend the sheet, said electrically conducting path extending transversely across and intersecting said conducting lines and adapted to be connected at the opposite ends thereof to a source of power to form a second circuit on said glass sheet surface, each of said bus bars being interrupted to form discontinuities on opposite sides of each connection between said conducting lines and said bus bars, respectively.

2. A glass sheet according to claim 1, wherein each opposite end of said electrically conducting path is provided with at least one extension directed angularly outwardly from said path along a marginal edge portion of said sheet.

3. A glass sheet according to claim 1, including a strip of coloring agent interposed between said glass sheet one surface and the electrically conducting material forming said bus bars and said electrically conducting path.

4. A glass sheet according to claim 1, including a pair of spaced electrically conducting paths located inwardly of said bus bars and intersecting said conducting lines, and juncture means electrically connecting one ends of said bus bars to said electrically conducting paths, respectively.

5. A glass sheet according to claim 1, including a pair of spaced electrically conducting paths extending transversely of said sheet along lines about which it is desired to bend the sheet, said sheet including a central portion defined between said paths and end portions extending laterally outwardly in opposite directions from said central portion and which are adapted to be bent about said paths.

6. A glass sheet according to claim 5, wherein each of said end portions is of a generally triangular configuration in outline with the associated electrically conducting path forming the base of said triangular configuration, said end portion having a pair of angularly related marginal edge portions, each bus bar being located in an end portion and extending along at least one of said marginal edge portions in spaced relation thereto and in substantial parallelism therewith.

7. A glass sheet according to claim 5, wherein said conducting lines extend longitudinally across said central portion between said electrically conducting paths and then angularly between said paths and said bus bars, respectively, said bus bars extending along and substantially parallel to at least a portion of the marginal edges of said end portions, respectively.

8. A glass sheet according to claim 7, including juncture means electrically connecting one ends of said bus bars to said electrically conducting paths, respectively.

9. A glass sheet according to claim 1, wherein said discontinuities define gaps in said bus bars on opposite sides of each connection between said connecting lines and said bus bar, respectively.

10. A glass sheet adapted to be sharply bent about at least one line extending transversely of said sheet comprising: a first circuit formed of electrically conducting material imprinted on one surface of said glass sheet and including a pair of bus bars and a plurality of spaced electrically conducting lines extending between and connected at their opposite ends to said bus bars, at least one electrically conducting path formed of electrically conducting material imprinted on said one surface between said bus bars and coincident with the line about which it is desired to bend the sheet, said electrically conducting path intersecting said conducting lines and adapted to be connected at the opposite ends thereof to a source of power to form a second circuit on said glass sheet surface, and means isolating said first and second circuits from each other.

11. A glass sheet according to claim 10, wherein said isolating means comprises interruptions in said first circuit adjacent the junctures of said conducting lines with said bus bars.

12. A glass sheet according to claim 11, wherein said interruptions define gaps in said bus bars on opposite sides of each connection between said connecting lines and said bus bar, respectively.

* * * * *